Figure 1:
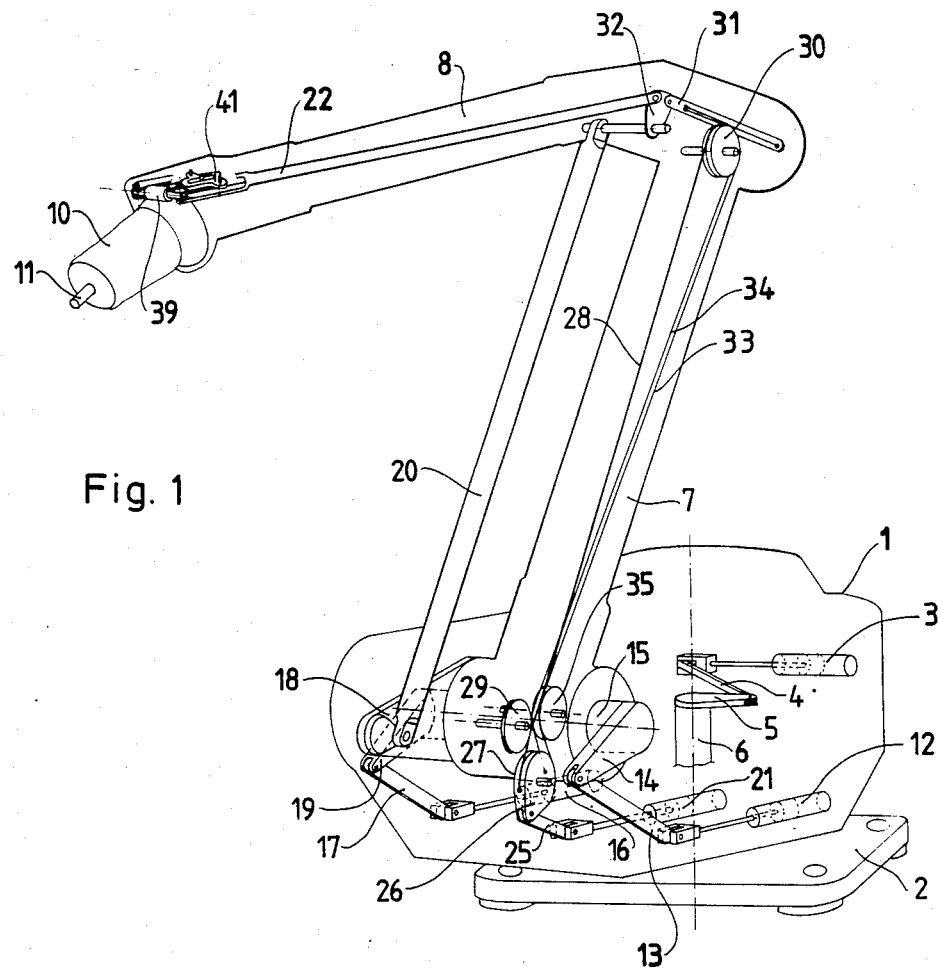

United States Patent [19]

Molaug

[11] Patent Number: 4,531,885
[45] Date of Patent: Jul. 30, 1985

[54] DEVICE FOR ROBOT MANIPULATOR

[75] Inventor: Ole Molaug, Byrne, Norway

[73] Assignee: Graco Robotics, Inc., Livonia, Mich.

[21] Appl. No.: 464,518

[22] PCT Filed: Sep. 24, 1982

[86] PCT No.: PCT/US82/01353

§ 371 Date: Jan. 10, 1983

§ 102(e) Date: Jan. 10, 1983

[30] Foreign Application Priority Data

Oct. 5, 1981 [NO] Norway ............................ 813365

[51] Int. Cl.³ ................................................ B66C 1/00
[52] U.S. Cl. ........................................ 414/735; 414/7;
901/21; 901/22; 74/479
[58] Field of Search ............................ 901/19–26,
901/36–38, 15; 414/730, 735, 917, 1, 4, 6, 7;
74/479

[56] References Cited

U.S. PATENT DOCUMENTS

| 4,259,876 | 4/1981 | Belyanin ........................ 414/7 X |
| 4,300,362 | 11/1981 | Lande et al. .................. 901/19 X |
| 4,378,959 | 4/1983 | Susnjara ...................... 414/735 X |

FOREIGN PATENT DOCUMENTS

| 2406493 | 8/1974 | Fed. Rep. of Germany . |
| 2531991 | 2/1976 | Fed. Rep. of Germany . |
| 3038419 | 4/1981 | Fed. Rep. of Germany . |
| 146165 | 1/1962 | U.S.S.R. ........................ 901/19 X |

Primary Examiner—Robert J. Spar
Assistant Examiner—Donald W. Underwood
Attorney, Agent, or Firm—Paul L. Sjoquist

[57] ABSTRACT

A device for robot manipulators having a multiply articulated manipulator arm (7, 8, 10) rotatably mounted in a swivelling socket (1), wherein all the servo-cylinders (46) are placed in the base (1) and wherein a mechanical power transmission mechanism is disposed between the tool holder (11) and each of the parts of the manipulator arm (7, 8, 10) respectively and the associated servo-cylinder (46). The linear movement of the individual servo-cylinders (46) is converted into a substantially proportional rotary movement over the whole working range of the servo-cylinder (46). Said power transmission mechanisms are so designed that when one or more of them is in action and the portions of the manipulator arm (7, 8, 10) are moved in relation to one another, the other power transmission mechanisms are not influenced as a result of these movements. All the servo-cylinders (46) have a piston rod (47), the diameter of which is reduced to below the bending limit for a conventional freely mounted piston rod, since the piston rod (47) is rigidly connected, at one end, to the piston (48) of the servo-cylinder (46) and is rigidly connected, at the other end, to a guide (50) adapted to slide or roll (51) in fixed guides (52), as a result of which the contact area and hence the friction between the piston rod (47) and piston rod packing (59) is reduced to a minimum.

10 Claims, 6 Drawing Figures

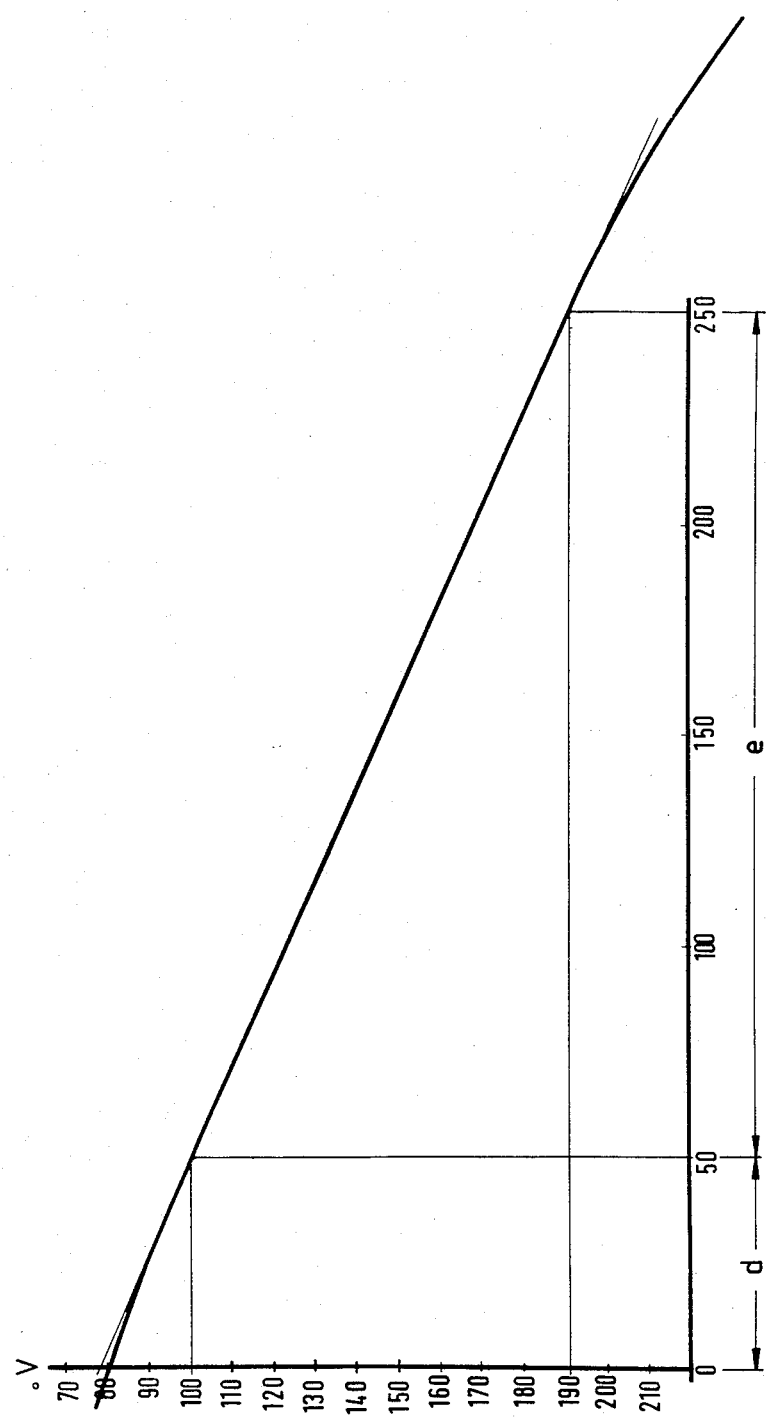

DEVICE FOR ROBOT MANIPULATOR

The present invention relates to a device for robot manipulators of the kind which has a multiple articulated manipulator arm rotatably mounted in a swivelling base, and wherein a front portion of the manipulator arm is rotatably connected, via a three-point connection, to a portion of the manipulator arm situated at the back so that the front portion of the manipulator arm can be turned, up to a certain angle, in all possible directions in relation to the rear portion of the manipulator arm by means of two longitudinally displaceable, substantially parallel stays, one end of which is rotatably secured to the front portion of the manipulator arm and form two of the points in said three-point connection, the third point consisting of a universal joint, and wherein the manipulator arm with a tool holder is controlled by a system with hydraulic servo-cylinders. Such robot manipulators have their movement pattern programmed in that a person takes hold of the manipulator arm and guides it in the required movement pattern which the robot manipulator arm can then repeat automatically.

One great disadvantage of the known robot manipulators of this kind is that it is difficult for a person to move the manipulator arm by hand with the required precision during the programming. This is due partly to the fact that the manipulator arm is comparatively heavy because hydraulic servo-cylinders for movements of the manipulator arm are mounted in its various arm portions and it is due partly to a comparatively great friction between the piston rods and the piston rod packing in the hydraulic servo-cylinders of the robot manipulator.

An attempt has previously been made to remedy the above-mentioned disadvantage by a separate passive programming arm with little mass and friction. Since the movements of the programming arm are stored on a so-called disc or corresponding magnetic storage medium, the robot manipulator can execute the same movements when it is controlled by the same disc.

A disadvantage of the separate programming arm, however, is the increased cost of the robot manipulator which the separate programming arm involves. Another disadvantage of the separate programming arm is that it necessarily requires like placing of the tool on the manipulator arm and the programming arm and this has proved to involve difficulties in practice.

Another disadvantage of the known robot manipulators of this kind is that the decomposition of the position measuring system in the various servo systems which control the rotary movements of the robot manipulator cannot be transmitted proportionally to the working range of the manipulator arm because the linear movement of the hydraulic servo-cylinders have to be converted into rotary movement, which leads to a less precise repetition of the programmed movement pattern.

Yet another disadvantage of the known robot manipulators of this kind is that the connections between the front portion of the manipulator arm and the piston rods of the hydraulic servo-cylinders which move the front portion in relation to the rear portion of the manipulator arm, are ball-and-socket joint connections which are expensive and difficult to make sufficiently accurate for this purpose, while at the same time the movement amplitudes in a ball-and-socket joint are limited.

Another disadvantage of the known robot manipulators of this kind is a less effective means to prevent the above-mentioned piston rods from twisting in relation to one another during displacement.

A disadvantage which follows from the fact that hydraulic servo-cylinders are placed in the manipulator arm in the known robot manipulators of this kind is that drops of oil from the hydraulic system can be most undesirable in individual cases, for example when handling edible material.

The object of the invention is to provide a robot manipulator of the above-mentioned kind without a separate programming arm and wherein the other above-mentioned disadvantages are eliminated, so that a person can easily move the manipulator arm by hand with the required precision during programming of the movement pattern of the robot manipulator.

A further object for the invention is to provide a robot manipulator wherein the servo-mechanisms of the robot manipulator have substantially the same decomposition in the position measuring system over the whole range of movement of the robot manipulator so that the programmed movements can be repeated by the robot manipulator with very great precision.

These objects are achieved according to the invention by the features which are given in the following Patent Claims.

Figure 2:
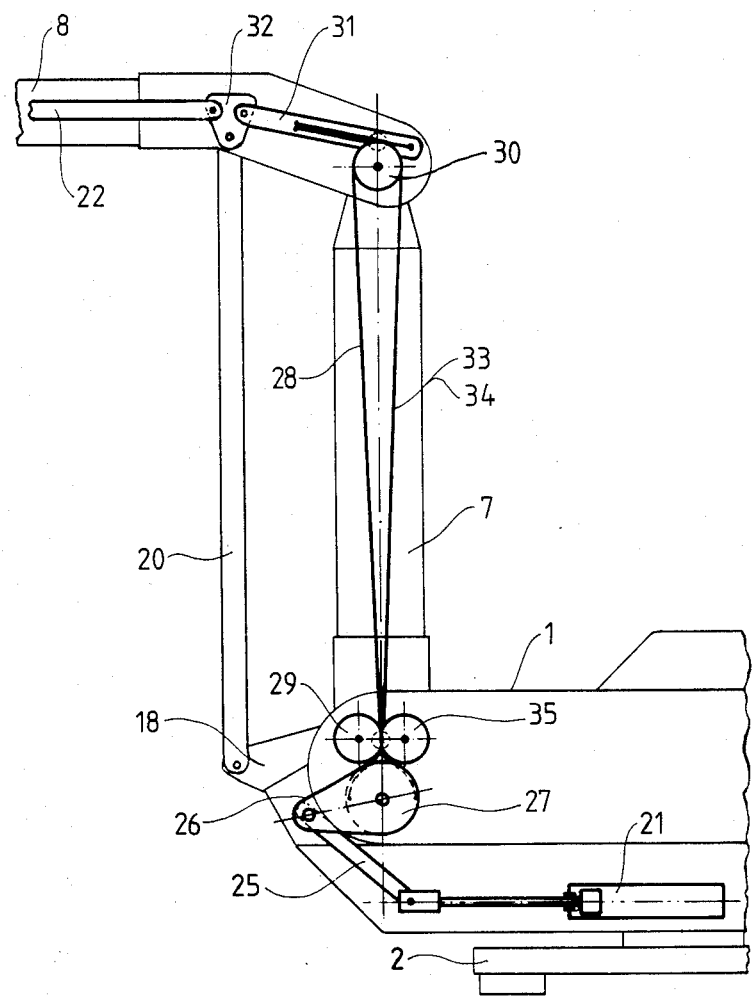

One example of embodiment of the invention is shown in the drawings, in which:

FIG. 1 shows diagrammatically, a perspective basic drawing of a robot manipulator with a device according to the invention, FIG. 2 shows, diagrammatically and seen from the side, the mechanical arrangement for transmitting movements from a hydraulic servo-cylinder mounted fixed in the base of the robot manipulator to a longitudinally displaceable stay in the manipulator arm of the robot manipulator, which stay participates in controlling movements of the manipulator arm in its front arm portion.

Figure 3:
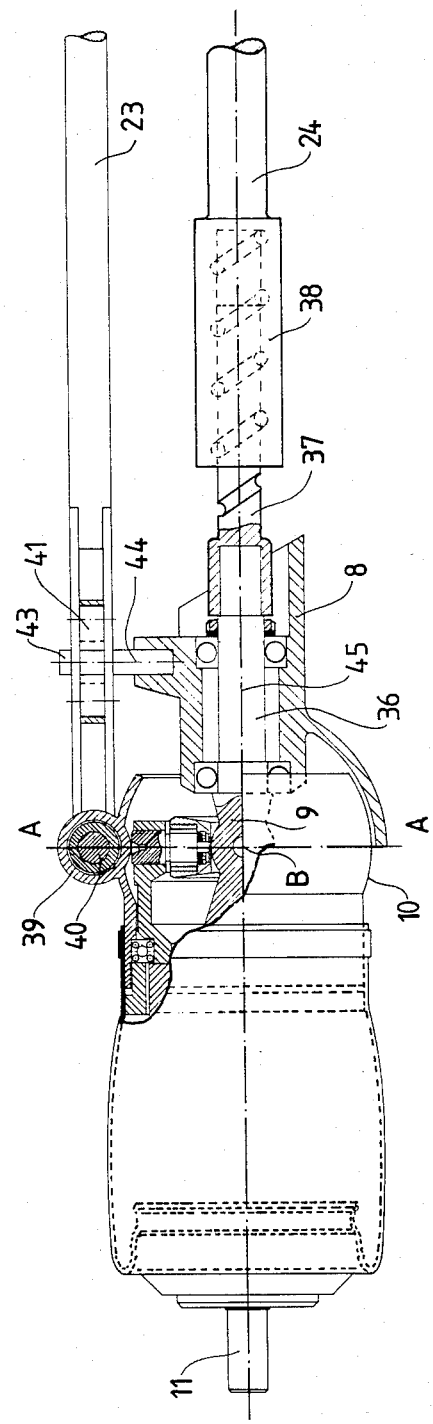
Figure 4:
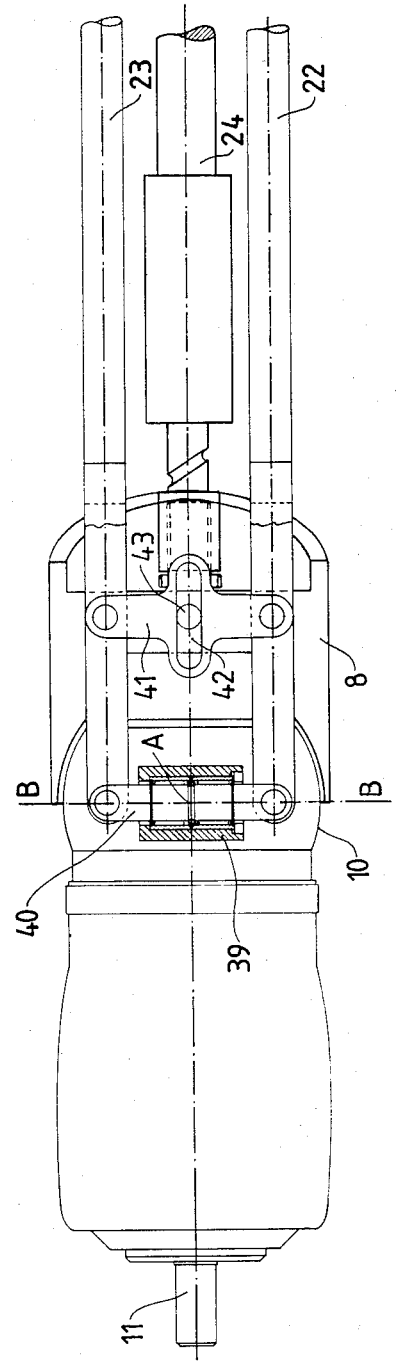
Figure 5:
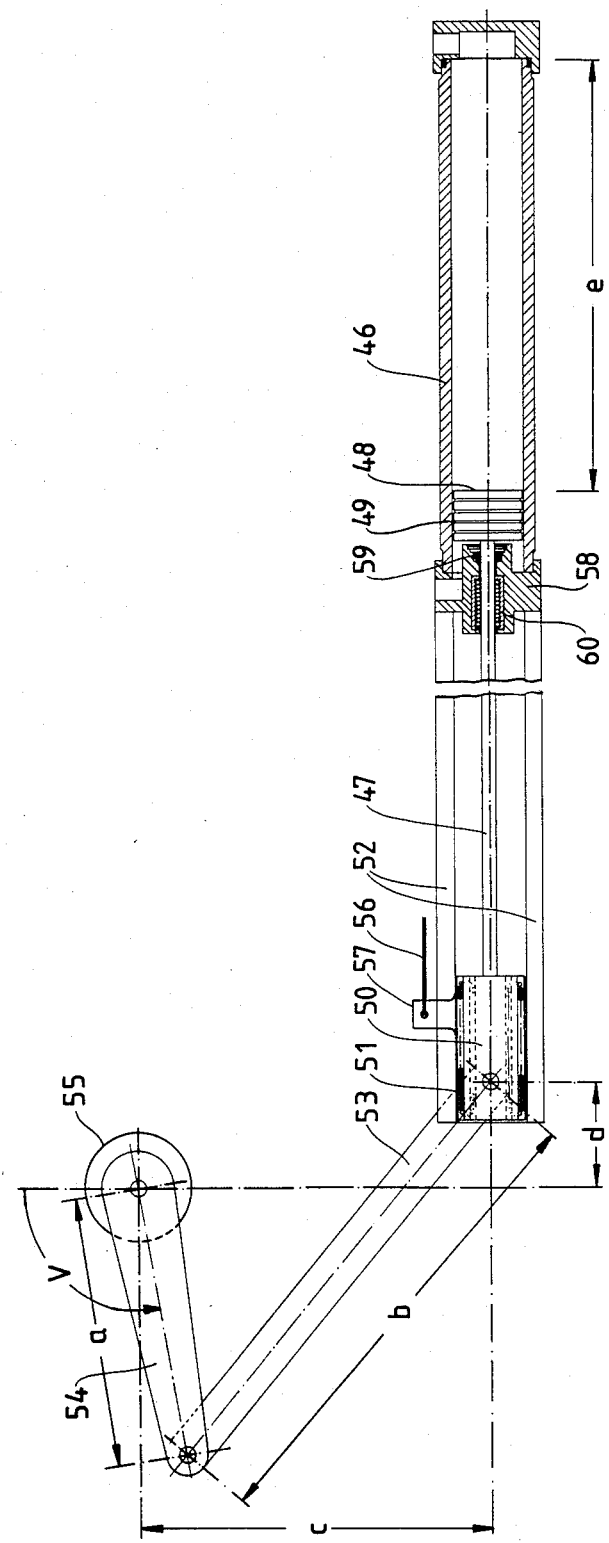

FIG. 3 shows, partially in section and seen from the side, the front portion of the manipulator arm with a device according to the invention, FIG. 4 shows, seen from above, the same part of the manipulator arm as is shown in FIG. 3, FIG. 5 shows diagrammatically and partially in section, any one of the hydraulic servo-cylinders of the robot manipulator with the associated arrangement up to the rotatable shaft which is acted upon by the servo-cylinder, FIG. 6 is a graph representation of the transmission of movement from the hydraulic servo-cylinder to the rotatable shaft which is shown in FIG. 5.

In FIG. 1 of the drawing, the reference numeral 1 designates the base of the robot manipulator which is rotatably mounted on a footplate 2 and can be turned by means of a first hydraulic servo-cylinder 3 placed in the base 1, in that the servo-cylinder 3 acts, via a first link 4, on a first crank arm 5 secured to the fixed shaft 6 of the base 1. The one end of the back portion 7 of the manipulator arm is rotatably mounted on the base 1, while the other end of the back portion 7 of the manipulator arm is rotatably mounted on one end of an intermediate portion 8, the other end of which is mounted, via a universal joint 9, (see FIG. 3) on a front portion 10 of the manipulator arm. The front portion 10 of the manipulator arm 7, 8, 10, is equipped with a rotatable tool holder 11.

The back portion 7 of the manipulator arm 7, 8, 10 can be rotated in relation to the base 1 by means of a second hydraulic servo-cylinder 12 placed in the base 1, in that the servo-cylinder 12 acts, via a second link 13, on a second crank arm 14 secured to the pivot shaft 15 of the back portion 7.

The intermediate portion 8 of the manipulator arm 7, 8, 10 can be rotated in relation to the back portion 7 by means of a third hydraulic servo-cylinder 16 placed in the base 1, in that the servo-cylinder 16 acts, via a third link 17 on a third crank arm 18 through a projection 19 secured to this, while the third crank arm 18 is rotatably connected to one end of a parallel stay 20, the other end of which is pivotally connected to the intermediate portion 8 of manipulator arm 7, 8, 10.

By means of three like power transmission mechanisms from three hydraulic servo-cylinders placed in the base 1, the front portion 10 of the manipulator arm 7, 8, 10 can be turned, up to a certain angle, in all possible directions in relation to the intermediate portion 8, and the tool holder 11 can rotate about its longitudinal axis.

For the sake of clarity, only one of the three above-mentioned like power transmitting mechanisms with the associated hydraulic servo-cylinder is shown in the drawing. The last-mentioned hydraulic servo-cylinder is designated by the reference numeral 2 and hereinafter is called the fourth hydraulic servo-cylinder.

Movements of the front portion 10 are caused by two longitudinally displaceable control rods placed in the intermediate portion 8 of the manipulator arm 7, 8, 10, only one of which, with the reference numeral 22, is shown in FIG. 1 for the sake of clarity. The other of said two control rods is shown in FIGS. 3 and 4 and designated by the reference numeral 23.

The rotation of the tool holder 11 about its longitudinal axis is brought about by means of action on a longitudinally displaceable control rod by a device which acts on the same known principle as a pump impeller. The last-mentioned control rod, which is shown in FIGS. 3 and 4 and is designated by the reference numeral 24, is also placed in the intermediate portion 8 of the manipulator arm 7, 8, 10, but is not shown in FIG. 1 for the sake of clarity.

The longitudinally displaceable control rod 22 can be displaced by means of the fourth hydraulic servo-cylinder 21 and a power transmission mechanism which is described in its broad features below.

The piston rod of the servo-cylinder 21 is pivotally connected—via a guide which will be discussed in more detail below—to one end of a fourth link 25, the other end of which is pivotally connected to a projection 26 on a wire attachment pulley 27 which is pivotally mounted in the base 1 and which also acts as a crank arm. Secured to the wire attachment pulley 27 is a first wire 28 which is taken round the front of the wire attachment pulley 27 and which, via the back of a first rotatable wire guide pulley 29 mounted in the base 1 and via a second rotatable wire guide pulley 30 mounted on the back portion 7 of the manipulator arm 7, 8, 10 and under the pivotable connection of this to the intermediate portion 8, is taken back and secured to the back end of a rail 31. By its front end, this is pivotally mounted on a rocker arm 32 which is pivotally mounted on the intermediate portion 8 of the manipulator arm 7, 8, 10. The back end of the longitudinally displaceable control rod 22 is also pivotally mounted on the rocker arm 32.

Secured to the wire attachment pulley 27 are a second and a third wire 33 and 34 which are taken round the back of the wire attachment pulley 27, that is to say at the opposite side to the wire 28, and which, via the front of a third rotatable wire guide pulley 35 mounted in the base 1 and via a second wire guide pulley 30 are taken forwards and secured to the front end of the rail 31. Thus the two wires 33 and 34 have a parallel course over the whole path. The first wire 28 has a course over the whole path which lies in a plane perpendicular to the axes of rotation of the wire attachment pulley 27 and the wire guide pulleys 29, 30, 35 and between the wires 33 and 34 extending parallel. As a result of the fact that the first wire 28 crosses between the second and third wires 33 and 34 at the top of the second wire guide pulley 30, the wire tension on the rail 31 is not oblique. The rail 31 is also provided with turnbuckles, not shown on the drawing, for the wires 28, 33 and 34.

The power transmission mechanism described above from the fourth hydraulic servo-cylinder 21 in the base 1 to the longitudinally displaceable control rod 22 in the intermediate portion 8 of the manipulator arm 7, 8, 10 is designed in such a manner that the back portion 7 of the manipulator arm 7, 8, 10 can be turned in relation to the base 1 and the intermediate portion 8 can be turned in relation to the back portion 7 without the wires 28, 33 and 34 being acted upon so that the control rod 22 in the intermediate portion 8 is displaced longitudinally. According to the invention, this is achieved in that the first and third wire guide pulleys 29, 35 are mounted in the base 1 at the same or substantially the same distance from the mounting of the associated wire securing pulley 27 in the base 1, and in that the back portion 7 is mounted in the base 1 so that the axis of rotation of the back portion 7 preferably lies near to the common center line of the first and third wire guide pulleys, 29, 35, for example 1/36th of the diameter of the wire guide pulleys 29, 35 below, and so that the axis of rotation of the back portion 7 lies equally far away from the axes of rotation of the first and third wire guide pulleys 29, 35, while at the same time the diameter of the first and third wire guide pulleys 29, 35 is selected so that so much wire 28 or 33, 34 respectively is wound on the wire guide pulleys 29, 35 respectively where the center spacing between the wire guide pulley 29, 35 respectively and the second wire guide pulley 30 is shortened as a result of the movement of the back portion 7, that the wire tension is kept constant, and that so much wire 33, 34 or 28 respectively is unwound from the wire guide pulley 35 or 29 respectively where the center spacing between the wire guide pulley 30 is lengthened as a result of movement of the back portion 7, that the wire tension is kept constant, which altogether means that the second wire guide pulley 30 is not rotated and that the rail 31 is not displaced longitudinally as a result of movements of the back portion 7 in relation to the base 1. The second wire guide pulley 30 is further mounted in the back portion 7 at a distance from the axis of rotation between the back portion 7 and the intermediate portion 8 which is equal to or substantially equal to the radius of the second wire guide pulley 30, and on a point on the straight line connecting said axis of rotation and the axis of rotation of the back portion 7 in the base 1, while at the same time the diameter of the second wire guide pulley 30 is selected so and the axis of rotation of the rocker arm 32 is placed so in relation to the axis of rotation between the back portion 7 and the intermediate portion 8, that, on a movement of the intermediate portion 8 in relation to the back portion 7, so much wire 28, 33, 34 is wound and unwound respectively in relation to the second wire guide pulley 30 that the wire tension is kept constant when the spacing between the axis of rotation of the second wire guide pulley 30 and the connection point between the rocker arm 32 and the rail 31 is altered as a result of movement of the intermediate portion 8 in relation to the back portion 7, which means that the rails 31 is not displaced longitudinally as a result of movements of the intermediate portion 8 in relation to the back portion 7.

It has proved advisable for the diameter of the first and third wire guide pulleys 29, 35 to be 4/5ths of the diameter of the second wire guide pulley 30 and for the distance between the axis of rotation of the back portion 7 in the base 1 and the axis of rotation of the second wire guide pulley 30 to be at least five times the diameter of the second wire guide pulley 30. The wire attachment pulley 27 must be so large that the wires 28, 33 and 34 respectively never lose contact with the first and third wire guide pulleys 29 and 35 respectively when the back portion 7 of the manipulator arm 7, 8, 10 is moved in relation to the base 1 within a desired range of movement.

It will now be explained in more detail, with reference to FIGS. 3 and 4 of the drawings, how the front portion 10 of the manipulator arm 7, 8, 10 of the robot manipulator and its tool holder 11 are connected to and moved by the three longitudinally displaceable control rods 22, 23 and 24 mounted in the intermediate portion 8 of the manipulator arm 7, 8, 10.

The front portion 10 of the manipulator arm 7, 8, 10 is adapted to be able to be turned in relation to the intermediate portion 8 about the axes A-A and B-B in FIGS. 3 and 4 of the drawings by means of its universal joint connection 9 to the intermediate portion 8 situated behind via a spindle 36 which is rotatably mounted in the intermediate portion 8 and the front portion of which is formed as a part of the universal joint 9.

The total holder 11 is connected to the rotatable spindle 36 via the universal joint 9. Screwed to the free end of the spindle 36 is a screw 37, the free end of which is received in a so-called ball nut 38 (not self-locking) secured to the free end of the longitudinally displaceable control rod 24. When the control rod 24 and hence the ball nut 38 is displaced longitudinally in that the associated hydraulic servo-cylinder in the base 1 is activated, the screw 37 will be turned on the same principle as the spindle in a pump impeller, whereupon the tool holder 11 is turned correspondingly.

The front portion 10 of the manipulator arm 7, 8, 10 is formed with a bearing housing 39 set transversely in which a journal 40 is rotatably mounted. The journal 40 cannot be displaced longitudinally in the bearing housing 39. The free ends of the longitudinally displaceable control rods 22 and 23 are pivotally mounted, each at its own end of the journal 40.

Two pivotable connections between the journal 40 and the guide rods 22 and 23 constitute two of three points in a three-point connection between the front portion 10 of the manipulator arm 7, 8, 10 and the intermediate portion 8 situated behind. The third point of the three-point connection consists of the universal joint 9.

When the front portion 10 of the manipulator arm 7, 8, 10 is to be turned in relation to the intermediate portion 8 of the manipulator arm 7, 8, 10, situated behind, about the axis B-B, the control rods 22 and 23 are displaced equally. When the front portion 10 of the manipulator arm 7, 8, 10 is to be turned in relation to the intermediate portion 8 of the manipulator arm 7, 8, 10, situated behind, about the axis A-A, the control rods 22 and 23 are displaced in relation to one another. It will easily be understood that the front portion 10 of the manipulator arm 7, 8, 10 can be adjusted, up to a certain angle, in all possible directions in relation to the intermediate portion 8 of the manipulator arm 7, 8, 10, situated behind, by different displacement of the control rods 22 and 23.

In order to prevent the control rods 22 and 23 from twisting in relation to one another during the displacement of the control rods 22 and 23, there is disposed in the vicinity of the connections of the control rods 22 and 23 to the journal 40 a transverse member 41, one end of which is pivotally connected to the control rod 22 and the other end of which is pivotally connected to the control rod 23. The transverse member 41 is formed in the middle with a groove 42 in the longitudinal direction of the control rods 22, 23. Received for sliding in the groove 42 is the free end of a pin 43 which is rigidly connected to the intermediate portion 8 of the manipulator arm 7, 8, 10 in such a manner that an extension of the center line 44 of the pin 43 passes through the center line 45 of the spindle 36.

It is clear from the above that in connection with the invention all the hydraulic servo-cylinders of the robot manipulator are placed in the base 1 of the robot manipulator and that linear movements from all the hydraulic servo-cylinders are converted into rotary movements by means of a crank device. In order that the servo-systems of the robot manipulator may be satisfactory, it is important that their position measuring systems should be closely connected to the hydraulic servo-cylinders, and that the servo-mechanisms should have substantially the same dissolution in the position measuring system over the whole range of movement of the tool holder 11. According to the invention, this is achieved in that all the servo-systems of the robot manipulator have an arrangement which is explained below the reference to FIGS. 5 and 6. In FIG. 5, the reference numeral 46 designates any one of the hydraulic servo-cylinders of the robot manipulator. The servo-cylinder 46 is rigidly mounted in the base 1 of the robot manipulator, which base is not shown in FIG. 5. The piston rod 47 of the servo-cylinder 46 is rigidly connected to the piston 48 of the servo-cylinder 46, which piston is formed with sealing grooves 49 (pressure-distribution grooves). At the other end, the piston rod 47 of the servo-cylinder 46 is rigidly connected to a guide 50 adapted to slide with rolling friction 51 in fixed guides 52. Pivotally mounted on the guide 50 is one end of a link 53, the other end of which is pivotally mounted on the end of a crank arm 54 rigidly connected to a rotatable shaft 55 mounted in the base 1 of the robot manipulator. The measuring system of the servo-cylinder 46, which is not shown in the drawing, is connected by means of a steel wire 56 to a projection 57 on the guide 50.

As a result of the fact that the length a of the crank arm 54 and the length b of the link 53 and the distance c between the axis of rotation of the shaft 55 and the center line of the piston rod 47 are in the ratio of a to 1.80a to 1.33a in relation to one another and that the distance d between the pivotal axis of the link 53 on the guide 50 when this is in the outer position, and the point of intersection between the center line of the piston rod 47 and a center line perpendicular to this through the axis of rotation of the shaft 55 is 0.39a, and that the stroke length of the servo-cylinder 46 is 1.66a, the effect is achieved that the linear piston movement of the servo-cylinder is converted into rotary movement of the shaft 55 so that the relationship between the angular rotation of the shaft 55 and the corresponding changes in position of the piston 48 of the servo-cylinder 46 is substantially constant over the whole working range of the servo-cylinder 46.

The substantially linear transmission of movement described above from the servo-cylinder 46 to the rotatable shaft 55 is shown graphically in FIG. 6 where the curve in the coordinate system shown indicates the angle V as a function of the distance of the guide 50 from the normal down from the center line of the shaft 55 when the stroke length e of the servo-cylinder 46 is set at 200 millimeters. The two actual dimensions d and e are marked out on the abscissa.

According to the invention, the friction between the piston rod 47 and the piston rod packing 59 in all the hydraulic servo-cylinders 46 of the robot manipulator is reduced to a minimum by a special arrangement whereby the diameter of the piston rod 47 is reduced to below the bending limit for a piston rod freely mounted in conventional manner. The arrangement is shown in FIG. 5 and will be explained in more detail below. It was explained above that the piston rod 47 is rigidly connected to the piston 48 of the servo-cylinder 46 and that, at the other end, the piston rod 47 is rigidly connected to a guide 50 adapted to slide with rolling friction 51 in fixed guides 52. At the piston rod side, the servo-cylinder 46 is equipped with an end member 58 in which, in addition to a piston rod packing 59, there is mounted a roller bush 60 through which the piston rod 47 is taken. The roller bush 60 is so long that the portion of the piston rod 47 which is inside the roller bush 60 at any time acts as if it were fixed. As a result of the fact that the piston rod 47 according to the invention is fixed at both ends, it has been possible to reduce the diameter of the piston rod very considerably in relation to the diameter of piston rod which, in view of the bending circumstances, would have been necessary if the piston rod 47 had been freely mounted at both ends in the usual manner. In this manner, it has been possible for example, to reduce a piston rod diameter from 20 millimeters to 8 millimeters. This means that the circumference of the piston rod is reduced from 62.8 millimeters to 25.1 millimeters. Since the friction between the piston rod and the packing is proportional to the pressure of the packing per unit area, the friction is reduced correspondingly.

I claim:

1. A device for robot manipulators of the kind which have a multiple articulated manipulator arm (7, 8, 10) rotatably mounted in a swivelling base (1) and wherein a front portion (10) of the manipulator arm (7, 8, 10) is rotatably connected, via a three-point connection, to a portion (8) of the manipulator arm (7, 8, 10) situated behind so that the front portion (10) of the manipulator arm (7, 8, 10) can be turned, up to a certain angle, in all possible directions in relation to the portion (8) of the manipulator arm (7, 8, 10) situated behind, by means of two longitudinally displaceable, substantially parallel rods (22, 23), one end of each of said rods which is pivotally secured to the front portion (10) of the manipulator arm (7, 8, 10) and form two of the points in said three-point connection the third point consisting of a universal joint connection (9) and wherein the manipulator arm (7, 8, 10) with a tool holder (11) is controlled by a system with hydraulic servo-cylinders (46), characterized in that all the servo-cylinders (46) are placed in the base (1) of the robot manipulator and that mechanical power transmission means are disposed between the tool holder (11) or each of the parts of the manipulator arm (7, 8, 10) respectively and the associated servo-cylinder (46), and that the front portion (10) of the manipulator arm (7, 8, 10) is formed with a bearing housing (39) which is set transversely and in which a journal (40) is mounted for rotation but not for displacement, and each of the parallel rods (22, 23) is respectively mounted on each end of the journal (40) for pivoting, and a transverse member (41) is pivotally connected to each of the parallel rods (22, 23) near the connection points of the rods (22, 23) to the journal (40), and the transverse member (41) has a groove (42) in the longitudinal direction of the rods (22, 23), and a pin (43) is rigidly connected to the intermediate portion (8) of the manipulator arm (7, 8, 10) and is received for sliding in the groove (42), wherein an extension of the center line (44) of the pin (43) passes through the center line (45) of a spindle (36) which is mounted in the intermediate portion (8) and which spindle (36) is connected to the universal joint (9).

2. A device as claimed in claim 1, characterized in that linear movements of the servo-cylinders (46) are converted into a substantially proportional rotary movement over the whole working range of the serovcylinders (46) by means of a crank arm (54), one end of which is rigidly connected to a rotatable shaft (55) and the other end of which is pivotally connected to the one end of a link (53), the other end of which is pivotally connected to a guide (50) which runs in a fixed guide (52) and which is connected to the piston rod (47) of the servo-cylinder (46).

3. A device as claimed in claim 2, characterized in that the length (a) of the crank arm (54) and the length (b) of the link (53) and the distance (c) between the axis of rotation of the shaft (55) and the center line of the piston rod (47) are the ratio of a to 1.80a to 1.33a to one another, and that the distance (d) between the pivotal axis of the link (53) in the guide (50) when this is an outer position and the point of intersection between the center line of the piston rod (47) and a center line perpendicular to this through the axis of rotation of the spindle (55) is 0.39a, and that the stroke length (e) of the servo-cylinder (46) is 1.66a, whereby the effect is achieved that the linear piston movement of the servo-cylinder is converted into rotary movement of the spindle (55) so that the relationship between the angle of rotation of the spindle (55) and corresponding changes in position of the piston (48) of the servo-cylinder (46) is substantially constant over the whole working range of the servo-cylinder (46).

4. A device as claimed in claim 1, characterized in that the back end of each of the two longitudinally displaceable control rods (22, 23) in the intermediate portion (8) of the manipulator arm (7, 8, 10) and the back end of a longitudinally displaceable control rod (24) extending substantially parallel to said control rods (22, 23) and adapted to be able to rotate the tool holder (11), about its longitudinal axis via a ball cut device (38) and the universal joint (9), are each pivotally mounted on a rocker arm (32) which is pivotally mounted on the intermediate portion (8), and each of the rocker arms (32) is pivotally connected to and adapted to be turned by a longitudinally displaceable rail (31) to the back and front ends of which respectively there are secured a first wire (28) and a second and third wire (33, 34) respectively, which are taken back or forwards respectively over a second rotatable wire guide pulley (30) mounted on the back portion (7) so far under its rotatable connection to the intermediate portion (8) that it approximately corresponds to the radius of the second wire guide pulley (30), the first wire (28), steel hand, chain or the like being taken further round the back of a first wire guide pulley (29) rotatably mounted in the base (1) and round the front of a wire attachment pulley (27) rotatably mounted in the base (1) to which pulley (27) the first wire (28) is secured, while at the same time the second and third wires (33, 34), steel band, chains or the like are taken further round the front of a third wire guide pulley (35) rotatably mounted in the base (1) and round the back of the wire attachment pulley (27) to which the second and third wires (33, 34) are secured, each of the three wire attachment pulleys (27) of the robot manipulator being adapted to be able to be rotated by one of the servo-cylinders mounted in the base (1).

5. A device as claimed in claim 4, characterized in that rotary movements are converted by means of the wires (28, 33, 34), steel band, chains or the like from the wire attachment pulley (27) mounted in the base (1) via the first and third wire guide pulleys (29, 35) mounted in the base (1) and the second wire guide pulley (30) which is mounted at the upper end of the back portion (7) of the manipulator arm (7, 8, 10) into linear movements of the rail (31) in such a manner that movements of the back portion (7) in relation to the base (1) do not influence the transmission, since the first and third wire guide pulleys (29, 35) are mounted in the base (1) at the same or substantially the same distance from the mounting of the associated wire attachment pulley (27) in the base (1), and the back portion (7) is mounted in the base (1) so that the axis of rotation of the back portion (7) preferably lies close to the common center line of the first and third wire guide pulleys (29, 35), for example 1/36th of the diameter of the wire guide pulleys (29, 35) below, and so that the axis of rotation of the back portion (7) lies equally far away from the axis of rotation of the first and third wire guide pulleys (29, 35), while at the same time the diameter of the first and third wire guide pulleys (29, 35) is selected so that so much wire (28 or 33, 34 respectively) is wound on the wire guide pulley (29 or 35 respectively), and the second wire guide pulley (30) is shortened as a result of movement of the back portion (7) that the wire tension is kept constant, and that so much wire (33, 34 or 28 respectively) is unwound from the wire guide pulley (35 or 29 respectively) where the center distance between the wire guide pulley (35 or 29) respectively and the second wire guide pulley (30) is lengthened as a result of movement of the back portion (7) that the wire tension is kept constant, which altogether means that the second wire guide pulley (30) is not turned and that the rail (31) is not displaced longitudinally as a result of movements of the back portion (7) in relation to the base (1).

6. A device as claimed in claim 4, characterized in that the diameter of the first and third wire pulleys (29, 35) is 4/5ths of the diameter of the second wire pulley (30) and that the distance between the axis of rotation of the back portion (7) in the base (1) and the axis of rotation of the second wire guide pulley (30) is at least five times the diameter of the second wire guide pulley (30), while at the same time the wire attachment pulley (27) is so large that the wires (28 and 33, 34 respectively) never lose contact with the first and third wire guide pulleys respectively (29 and 35 respectively) when the back portion (7) of the manipulator arm (7, 8, 10) is moved in relation to the base (1) within a desired range of movement.

7. A device as claimed in claim 4, characterized in that rotary movements are converted by means of the wires (28, 33, 34), steel band, chains or the like, from the wire attachment pulley (27) mounted in the base (1) via the first and third wire guide pulleys (29, 35) mounted in the base (1) and the second wire guide pulley (30) which is mounted at the upper end of the back portion (7) of the manipulator arm (7, 8, 10) into linear movements of the rail (31) in such a manner that movements of the intermediate portion (8) in relation to the back portion (7) do not influence the transmission, since the second wire guide pulley (30) is mounted in the back portion (7) at a distance from the pivotal axis between the back portion (7) and the intermediate portion (8) which is equal to or substantially equal to the radius of the second wire guide pulley (30), and preferably on a straight line between said pivotal axis and the axis of rotation of the back portion (7) in the base (1), while at the same time the diameter of the second wire guide pulley (30) is selected so, and the pivotal axis of the rocker arm (32) is placed so in relation to the pivotal axis between the back portion (7) and the intermediate portion (8) that, on a movement of the intermediate portion (8) in relation to the back portion (7), so much wire (28, 33, 34) is wound and unwound respectively in relation to the second wire guide pulley (30) that the wire tension is kept constant when the distance between the axis of rotation of the second wire guide pulley (30) and the connecting point between the rocker arm (32) and the rail (31) is altered as a result of movement of the intermediate portion (8) in relation to the back portion (7), which means that the rails (31) is not displaced longitudinally as a result of movements of the intermediate portion (8) in relation to the back portion (7).

8. A device as claimed in claim 1, characterized in that all the servo-cylinders (46) of the robot manipulator have a piston rod (47) the diameter of which is reduced to below the bending limit for a conventional freely mounted piston rod, since the piston rod (47) is rigidly connected, at one end, to a piston (48) of the servo-cylinder (46) and is rigidly connected at the other end, to a guide (50) adapted to slide or roll (51) in fixed guides (52), as a result of which the contact area and hence the friction between the piston rod (47) and piston rod packing (59) is reduced to a minimum.

9. A device as claimed in claim 8, characterized in that disposed between the fixed gripping of the piston rod (47) at both ends is a roller bush (60) through which the piston rod (47) is taken, and that the roller bush (60) is so long that the portion of the piston rod (47) which is inside the roller bush (60) at any time acts as if it were firmly gripped.

10. A device for robot manipulators of the kind which have a multiple articulated manipulator arm (7, 8, 10) rotatably mounted in a swivelling base (1) and wherein a front portion (10) of the manipulator arm (7, 8, 10) is rotatably connected, via a three-point connection, to a portion (8) of the manipulator arm (7, 8, 10) situated behind so that the front portion (10) of the manipulator arm (7, 8, 10) can be turned, up to a certain angle, in all possible directions in relation to the portion (8) of the manipulator arm (7, 8, 10) situated behind, by means of two longitudinally displaceable, substantially parallel rods (22, 23), one end of each of said rods which is pivotally secured to the front portion (10) of the manipulator arm (7, 8, 10) and form two of the points in said three-point connection, the third point consisting of a universal joint connection (9) and wherein the manipulator arm (7, 8, 10) with a tool holder (11) is controlled by a system with hydraulic servo-cylinders (46), characterized in that all the servo-cylinders (46) are placed in the base (1) of the robot manipulator and that mechanical power transmission means are disposed between the tool holder (11) or each of the parts of the manipulator arm (7, 8, 10) respectively and the associated servo-cylinder (46), and that linear movements of the servo-cylinders (46) are converted into a substantially proportional rotary movement over the whole working range of the servo-cylinders (46) by the means of a crank arm (54), one end of which is rigidly connected to a rotatable shaft (55) and the other end of which is pivotally connected to the one end of a link (53) to the other end of which is pivotally connected to a guide (50) which runs in a fixed guide (52) and which is connected to the piston rod (47) of the servo-cylinder (46).

* * * * *